E. E. HAUER.
STRAINER.
APPLICATION FILED JUNE 6, 1910.

1,001,026.

Patented Aug. 22, 1911.
3 SHEETS—SHEET 1.

Witnesses
Grover Algim
Virgil Bahn

Inventor
Elmer E. Hauer
By Percy Norton
Attorney

E. E. HAUER.
STRAINER.
APPLICATION FILED JUNE 6, 1910.

1,001,026.

Patented Aug. 22, 1911.

3 SHEETS—SHEET 3.

Witnesses

Inventor
Elmer E. Hauer
By Percy Norton
Attorney

UNITED STATES PATENT OFFICE.

ELMER E. HAUER, OF SPRINGFIELD, OHIO, ASSIGNOR TO THE LAGONDA MANUFACTURING COMPANY, OF SPRINGFIELD, OHIO, A CORPORATION OF OHIO.

STRAINER.

1,001,026.  Specification of Letters Patent.  Patented Aug. 22, 1911.

Application filed June 6, 1910. Serial No. 565,395.

*To all whom it may concern:*

Be it known that I, ELMER E. HAUER, a citizen of the United States, residing at Springfield, in the county of Clark and State of Ohio, have invented certain new and useful Improvements in Strainers, of which the following is a specification, reference being had therein to the accompanying drawings.

My invention relates to strainers, and more particularly to a strainer arranged so that the refuse caught by it can be removed without interrupting the flow of the fluid.

The object of my invention is to provide a strainer of improved construction that will afford the greatest freedom of flow and yet be effective and easily operated to remove the refuse caught by the strainer and to that end a casing is provided having a main straightway conduit for the flow of the fluid and a plurality of chambers opening into said conduit, each of said chambers being provided with a strainer movable independently into said conduit with means to close each of said chambers when occupied by a strainer.

A further object is to provide improved means of moving the strainer elements to and from said conduit and chambers and to close said chambers when occupied by the strainer elements, and further to provide improved means for removing the idle strainer for cleaning and repairs.

With these and other objects in view my invention consists of the constructions and combinations hereinafter described and set forth in the claims.

Figure 1:
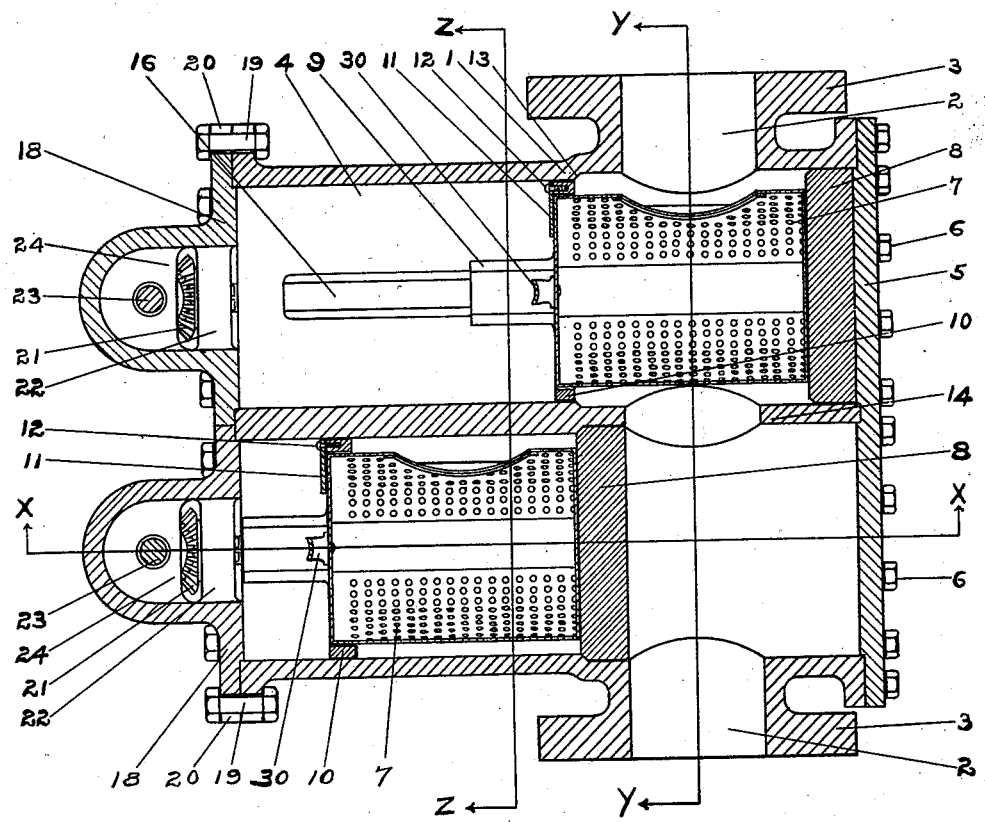
Figure 2:
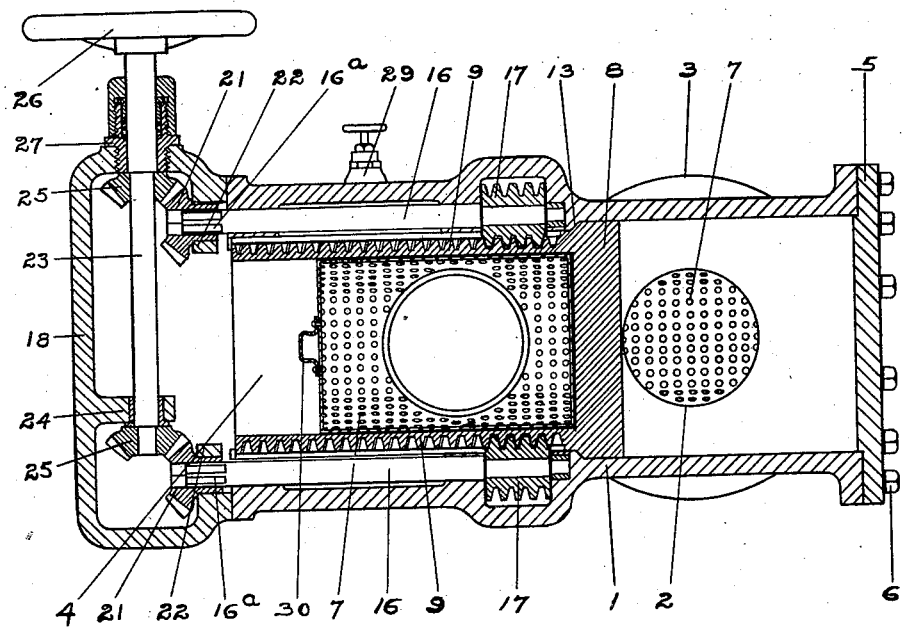
Figure 3:
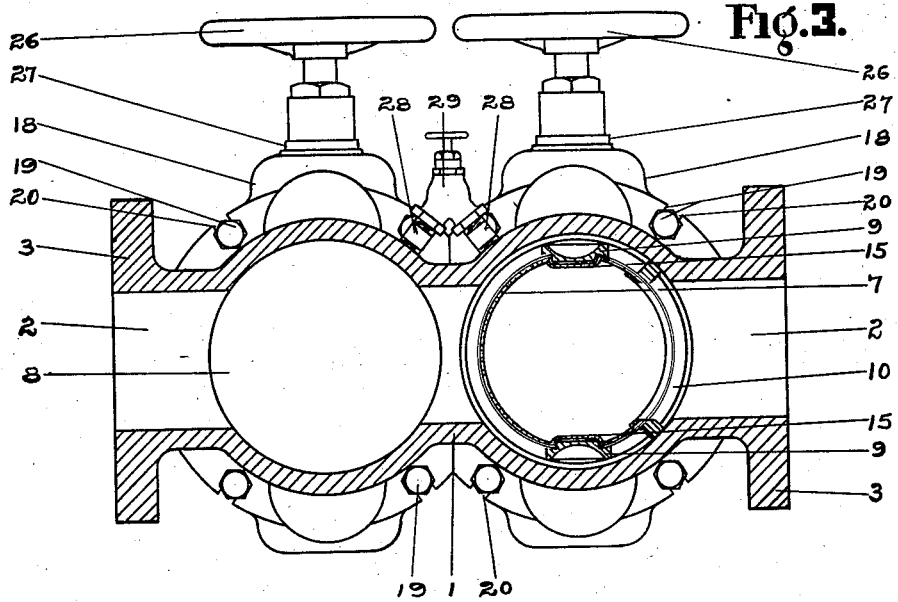
Figure 4:
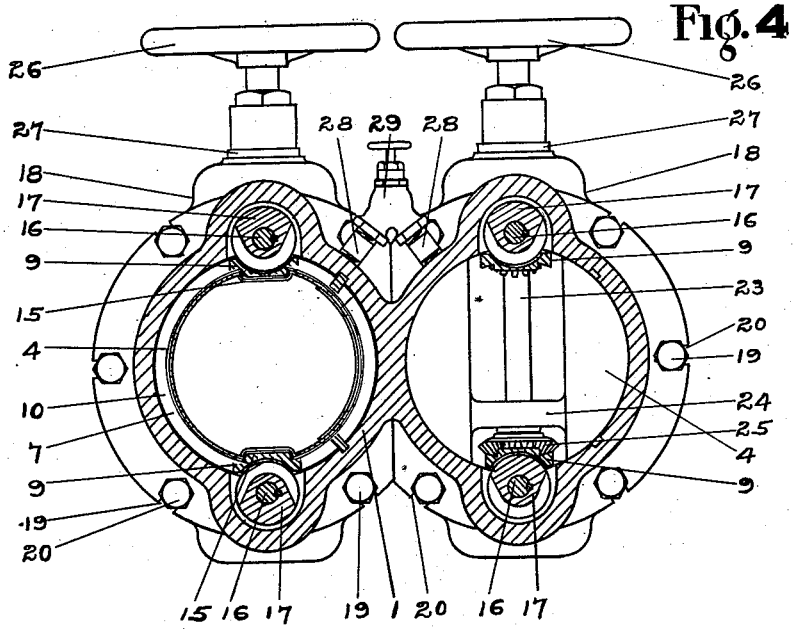

In the accompanying drawings Figure 1 is a longitudinal section of a strainer embodying my invention. Fig. 2 is a section on the line X—X of Fig. 1. Fig. 3 is a section on the line Y—Y of Fig. 1 and Fig. 4 is a section on the line Z—Z of Fig. 1.

Like numerals represent the same parts in the several views.

In the drawings 1 represents a casing forming a straightway conduit 2 having flanges 3 to secure it to the pipe line into which it is to be installed. At one side of said conduit and preferably cast integrally therewith as shown, the casing 1 is extended to form a plurality of chambers 4, two being shown arranged parallel with each other and opening into said conduit. For convenience in manufacture a head 5 is preferably formed separate from said casing 1 and removably secured thereto by bolts 6.

A strainer basket 7 is provided for each of said chambers and is carried in a frame having a head 8 with projecting rack bars 9 and a ring 10, a latch 11 pivoted to turn on a bolt 12 being provided to secure the basket within the frame. The head 8 of the frame is adapted to move against a seat 13 and acts as a valve to prevent the fluid flowing into the chamber. A supporting guide 14 is provided on which said head or valve moves into said conduit, the ring 10 forming the other end of the frame moving on the inner walls of the chamber. The strainer baskets 7 are formed with longitudinally extending recesses 15 adapted to fit projections of like shape formed on the rack bars 9, to guide and keep the baskets from turning in the frame.

Shafts 16 disposed in longitudinal recesses of the casing and journaled in the walls thereof as shown are provided with worm gears 17 adapted to mesh with the rack bars 9. Independently removable heads 18 are provided for each chamber, said heads being shown secured in place by bolts 19 through slots 20 in said heads. Bevel gears 21 are journaled in projections 22 of each of the heads, and are provided with square holes into which squared end 16$^a$ of the shafts 16 project. Shafts 23 journaled in each of the heads and in projections 24 thereof have fixed thereon bevel gears 25 adapted to mesh with the gears 21. A hand-wheel 26 is provided to operate said shaft and gears and a stuffing box 27 prevents leakage from the head.

A pipe connection 28 is provided with a valve 29, the opening of which will equalize the pressure in the chambers to permit of the easy movement of the strainer.

It will be seen that by turning the hand-wheel on any one of the heads 18 the bevel and worm gears and racks are operated to move the strainer into the conduit and that by reversing the operation the strainer is moved into a chamber, the head or valve 8 of the strainer frame seating itself and preventing the flow of the fluid into a chamber when occupied by a strainer. The head 18 of the chamber occupied by the idle strainer can be easily removed and the strainer taken out for cleaning or repairs. The handle 30 on the strainer is provided for the easy handling thereof. It will be seen that the arrangement for moving the baskets is wholly outside the baskets, leaving them free to carry the refuse matter caught by same.

Having thus described my invention, I claim:

1. The combination of a casing forming a conduit and a chamber opening into said conduit and further having a seat, a strainer basket and a supporting frame for same having a head immovable in its relation thereto adapted to move against said seat and prevent the flow of fluid into said chamber when occupied by said basket strainer, said chamber having an opening for the removal of said basket strainer, a closure for said opening, and means to move said frame to carry said basket strainer into said conduit, substantially as described.

2. The combination of a casing forming a partitionless straightway conduit and a plurality of chambers arranged parallel with each other on the same side of and opening into said conduit, strainers in each of said chambers and means to move each independently of the others into said conduit and means to prevent the flow of fluid into said chambers when occupied by said strainers, substantially as described.

3. The combination of a casing forming a partitionless straightway conduit and a plurality of chambers arranged parallel with each other on the same side of and opening into said conduit, guide ways formed integrally with the walls of said conduit, strainers and supporting frames for same adapted to move on said guide ways into said chambers, means to move said frames independently of each other to carry said strainers into said conduit and means to prevent the flow of fluid into said chambers when occupied by said strainers, substantially as described.

4. The combination of an integral casing forming a partitionless straightway conduit and a plurality of chambers arranged parallel with each other on the same side of and opening into said conduit, said casing further having seats and transverse guide ways formed integrally with the walls of said conduit, strainer baskets and frames to support the same with their open ends facing the inlet of said conduit, means to move said frame on the inner walls of said chambers and on said guide ways to carry said strainer baskets to and from said conduit and chambers, said frames being adapted to move against said seats to prevent the flow of fluid into the chambers when occupied by said strainer baskets, substantially as described.

5. The combination of a casing forming a conduit and a chamber opening into said conduit, a strainer and a supporting frame for same adapted to prevent the flow of fluid into said chamber when occupied by said basket strainer, said chamber having an opening for the removal of said basket strainer, a closure for said opening, and means manipulated from outside said casing and adapted to engage opposite sides of said frame without obstructing the interior of the basket to move the same and carry said basket strainer to and from said chamber and conduit, substantially as described.

6. The combination of a casing forming a conduit and a chamber opening into said conduit and further having a seat, a strainer basket and a supporting frame for same having a head adapted to move against said seat and prevent the flow of fluid into said chamber when occupied by said basket strainer, said chamber having an opening for the removal of said basket strainer, a closure for said opening and means manipulated from outside said casing arranged outside said basket strainer and adapted to engage said frame to move the same and carry said basket strainers to and from said conduit and chamber, substantially as described.

7. The combination of a casing forming a conduit and a chamber opening into said conduit, a strainer basket, means manipulated from outside said casing and arranged without obstructing the interior of said strainer basket to move the same to and from said chamber and conduit and means to prevent the flow of fluid into said chamber when occupied by said strainer basket, substantially as described.

8. The combination of a casing forming a conduit and a chamber opening into said conduit, a strainer basket and a supporting frame for same having rack bars, gears journaled in said casing and adapted to mesh with said bars, and means to operate the same to move said strainer basket to and from said conduit and strainer, substantially as described.

9. The combination of a casing forming a conduit and a chamber opening into said conduit, said chamber further having longitudinal recesses, a strainer basket and a supporting frame for same having oppositely disposed rack bars, shafts disposed in said longitudinal recesses and having gears adapted to mesh with said rack bars, said casing having an opening to said chamber and a removable closure for same, and means carried by said closure to operate said shaft, substantially as described.

10. The combination of a casing forming a conduit and a chamber opening into said conduit having longitudinal recesses and a seat and strainer basket and a supporting frame for same, having a head adapted to move against said seat, said frame further having rack bars, shafts disposed in said longitudinal recesses and having gears adapted to mesh with said rack bars and means to operate said shafts, substantially as described.

11. The combination of a casing forming a conduit and a chamber opening into said conduit, a strainer basket and a supporting frame for same movable from said chamber to said conduit, the interior of said frame and the exterior of said basket having longitudinally extending and abutting portions to guide the basket into the frame and keep the basket from turning in the frame, substantially as described.

12. The combination of a casing forming a partitionless straightway conduit and a plurality of chambers arranged parallel to each other and on the same side of and opening into said conduit and having annular seats at said opening, strainer baskets for each chamber and supporting frames for same having heads immovable in their relation to said frames adapted to move against said seats and prevent the flow of fluid into said chambers when occupied by said strainers and means to equalize the pressure in said chambers, substantially as described.

In testimony whereof, I have hereunto affixed my signature in the presence of two witnesses.

ELMER E. HAUER.

Witnesses:
W. T. HAMILTON,
OLIVER H. HOUSE.

---

Copies of this patent may be obtained for five cents each, by addressing the " Commissioner of Patents, Washington, D. C."